June 19, 1951  R. B. DAVIS  2,557,263
SOUNDING ATTACHMENT
Filed July 30, 1948
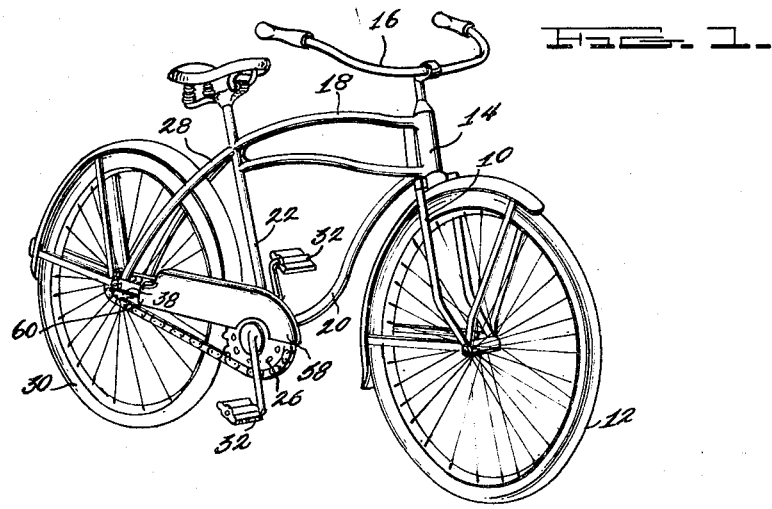
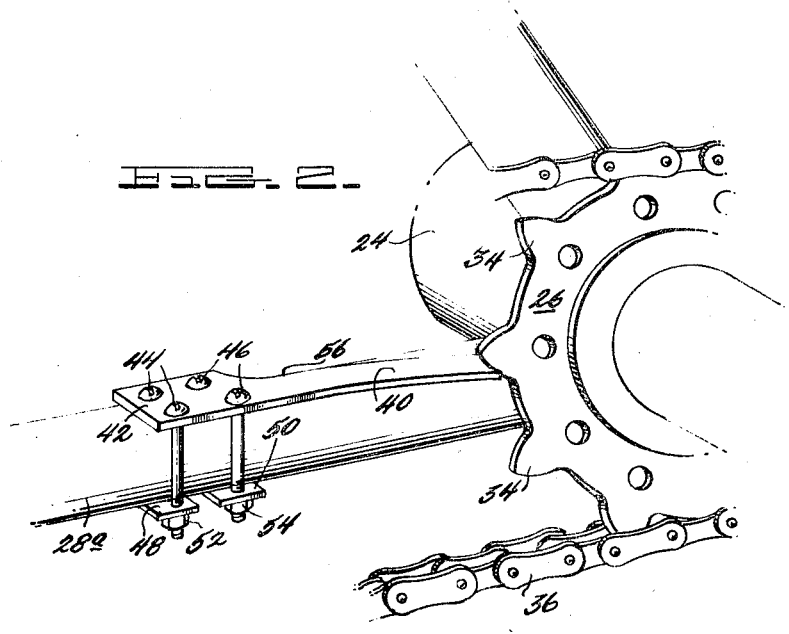
Inventor
RALPH B DAVIS
By Church & Church
ATTORNEYS Patented June 19, 1951

2,557,263

UNITED STATES PATENT OFFICE 2,557,263

SOUNDING ATTACHMENT

Ralph B. Davis, Prestonsburg, Ky.

Application July 30, 1948, Serial No. 41,459

2 Claims. (Cl. 116—56)

The present invention relates to new and useful improvements in wheeled vehicles and more particularly to such improvements in an occupant propelled vehicle, such as a bicycle or the like.

In many vehicles which are propelled by the occupant, such as in bicycles or the like, there is provided a chain and sprocket driving mechanism. In this type of drive mechanism one of the sprocket wheels is provided with foot pedals through which the occupant transmits the driving power to a driving wheel. A driving chain connects that sprocket wheel with another sprocket wheel which is normally associated with the axle of the driving wheel of the vehicle. Thus, rotation of the pedals by the occupant will effect rotation of the driving sprocket wheel with resultant travel of the endless driving chain and rotation of the driven sprocket wheel which imparts rotation to the ground engaging driving wheel of the vehicle.

An object of the present invention is to provide a wheeled vehicle substantially of the above type having an audible sounding device operable by a relatively moving part of the vehicle.

Another object of the invention is to provide a wheeled vehicle substantially of the above type having a clicker operated by one of the sprocket wheels to simulate the sound of a motor driven vehicle.

A further object of the invention is to provide a bicycle or similar vehicle with a motor simulating sounding device and having a chain guard terminating in a simulated exhaust.

A still further object of the invention is to provide a sounding attachment in the form of a clicker which is constructed and arranged to be conveniently attached to substantially any type of wheeled vehicle having a sprocket or similar drive for operation thereof.

The invention still further aims to provide an audible sounding device of simple construction adapted for use with bicycles or similar vehicles and which includes a resilient spring arm adapted for engagement with a sprocket or the like moving part having means for readily attaching the same in proper position on the vehicle frame.

The above and other objects of the invention will in part be obvious and will be hereinafter more fully pointed out.

In the accompanying drawings wherein the reference numerals refer to like parts throughout the several views:

Figure 1 is a perspective view of one form of vehicle, such as a bicycle, to which the sounding device is attached; and Fig. 2 is an enlarged fragmentary perspective view showing the details of the construction and attachment of the sounding device.

Referring more in detail to the accompanying drawing, and particularly to Fig. 1 thereof at this time, there is shown a bicycle of more or less conventional form as the vehicle to which the sounding device of the present invention may be conveniently attached. The bicycle includes a forwardly depending front fork 10 carrying the front wheel 12 and journaled in a frame bearing 14. The upper end of the fork member 10 is connected to a handle bar 16 through which the front wheel 10 is turned for guiding purposes. The frame of the vehicle includes a horizontal top frame 18 joined to the bearing 14 and downwardly extending front and rear bars 20, 22, respectively, which merge together at a bearing sleeve 24 in which the shaft of a driving sprocket wheel 26 is journaled. A rear fork member 28 extends rearwardly from the bearing sleeve and supports a rear driving wheel 30 between the arms thereof.

The driving sprocket wheel 26 is provided with foot pedals 32 by which it is operated by the occupant. The projections or sprockets 34 of the sprocket wheel 26 successively engage the links of a conventional driving chain 36 which is trained over a driven sprocket wheel 38 at the axis of the rear wheel 30 so that motion imparted through the foot pedals 32 and driving sprocket wheel 26 will be transmitted through the chain 36 and rear sprocket wheel 38 to the rear driving wheel 30 of the vehicle.

The audible sounding device is mounted on the arm 28a of the rear fork 28 and consists of a resilient spring arm 40, preferably formed of flat spring steel stock or similar material, and a base or body portion 42 which is adapted to be secured over the arm 28a in such position that the free end of the arm 40 is disposed in the path of rotation of the sprocket projections 34 so as to be engaged and flexed thereby to provide an audible clicking as the sprocket wheel 26 is rotated. The body portion 42 of the spring arm is provided with four apertures to receive two pairs of bolts 44, 46, in a substantially square peripheral arrangement. The inner and outer bolts of each pair 44, 46, are disposed on opposite sides of the fork arm 28a and the lower ends thereof extend through clamping plates 48, 50, respectively, which are disposed beneath the bottom surface of the arm 28a. The bolts of each pair are secured by nuts 52, 54, or the like, and tightening thereof will effect firm clamping of the body portion 42 to the arm 28a with the spring arm 40 in proper position. It is to be noted that the inner longitudinal edge of the spring arm 40 is offset outwardly, as at 56, from the fork arm 28a, so as to insure freedom of movement as the free end is flexed by the sprocket projections.

There is also provided a housing 58 suitably connected to the bicycle frame and this housing is shaped to partially inclose the front and rear sprocket wheels 26, 38, respectively, and the driving chain 36. The rear end of the casing terminates in an open nozzle which simulates the exhaust 60 of a motor operated vehicle. The casing not only serves as a protective guard against injury to the operator by the chain or sprocket wheels, but also serves as a resonant or sound board effect to add to the motor simulated noise effect of the sounding clicker as the free end of the spring arm 40 is engaged by the sprocket projections, flexed and then suddenly released therefrom.

From the foregoing description, it will be apparent that the present invention provides an extremely efficient and easily assembled sounding mechanism which is in the form of a clicker device affording in a bicycle or the like the simulated sound of a motor driven vehicle, such as a motorcycle, as well as giving an audible warning of the presence of the normally silent bicycle type of vehicle. The sounding arm is illustrated as being positioned for operation by the driving sprocket but it is obvious that it could as well be operatively associated with some other part of the driving mechanism or other moving part of the illustrated bicycle or similar vehicle. The casing also serves to more realistically simulate a motor sound not only by the provision of an exhaust, but also by enclosing the sounding mechanism.

While one form of the invention has been shown and described for purposes of illustration, it is to be clearly understood that various changes in the details of construction and arrangement of parts may be accomplished without departing from the scope of the invention as set forth in the appended claims.

What is claimed is:

1. In combination with a bicycle having a sprocket drive, the provision of a resilient spring arm having the free end thereof disposed to successively engage the sprocket projections to simulate the sound of a motor, and means rigidly securing the opposite end of said arm to the frame of the vehicle.

2. In combination with a bicycle having a sprocket drive, the provision of a resilient spring arm having the free end thereof disposed to successively engage the sprocket projections to simulate the sound of a motor, means rigidly securing the opposite end of said arm to the frame of the vehicle, and a guard housing at least partially enclosing said resilient arm and the sprocket drive and terminating rearwardly in a simulated exhaust.

RALPH B. DAVIS.

REFERENCES CITED

The following references are of record in the file of this patent:

UNITED STATES PATENTS

| Number | Name | Date |
|---|---|---|
| 569,158 | Arnold | Oct. 13, 1896 |
| 660,229 | Stratton et al. | Oct. 23, 1900 |
| 739,095 | Lewitz | Sept. 15, 1903 |
| 2,463,925 | Vetter | Mar. 8, 1949 |

FOREIGN PATENTS

| Number | Country | Date |
|---|---|---|
| 4,325 | Great Britain | Apr. 16, 1898 |